Patented Oct. 20, 1953

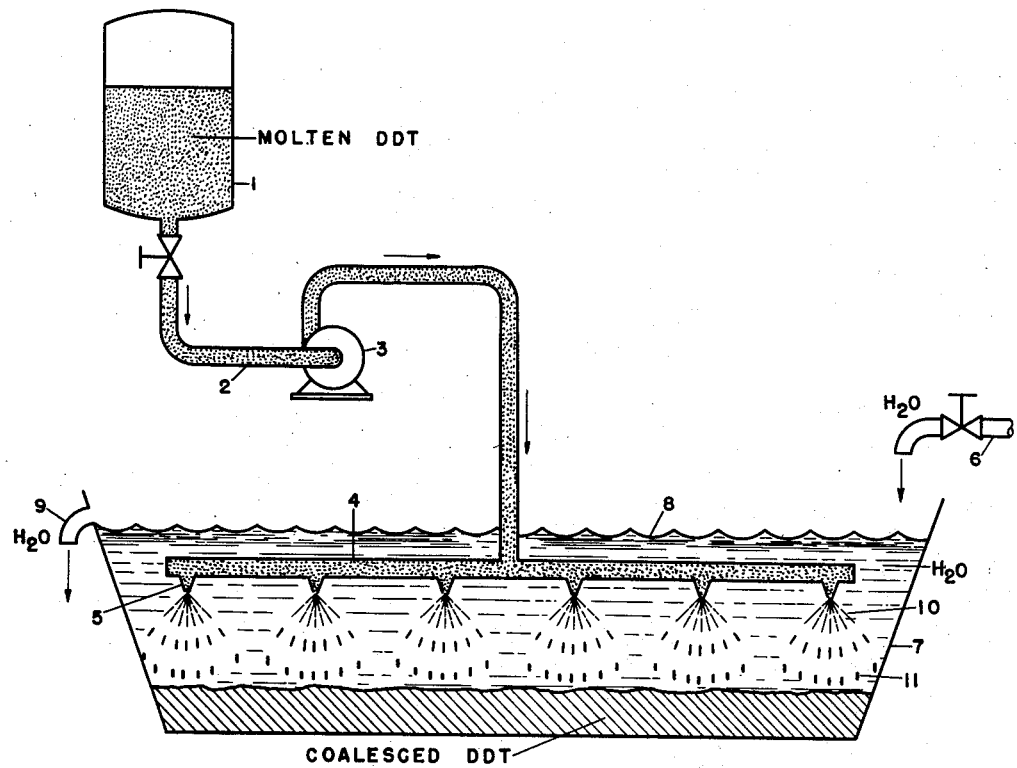

2,656,396

UNITED STATES PATENT OFFICE 2,656,396

PRODUCTION OF DDT

Cyril Hayward, Tarentum, Pa., assignor to The Pennsylvania Salt Manufacturing Company, Philadelphia, Pa., a corporation of Pennsylvania Application June 30, 1949, Serial No. 102,430

6 Claims. (Cl. 260—649)

This invention relates to a process for production of a DDT product in a hard, brittle, solid form.

DDT (this term is generally used to denote 2,2-bis(p-chlorophenyl)-1,1,1-trichloroethane as well as crude products predominating in this compound) is a synthetically produced organic material which may be made, for example, by condensing chlorobenzene with chloral. The dichlorodiphenyltrichloroethane product of such synthesis is generally recovered in the form of a melt which is then solidified, e. g. in cooling pans, to the waxy solid which is the characteristic form of this material previously available. The waxy nature of this material is particularly pronounced in the so-called technical grade solid, the immediate product of the synthesis procedure, and in various partially refined dichlorodiphenyltrichloroethane products. It may be that small amounts of isomeric compounds and other compounds formed in side reactions during the synthesis of the dichlorodiphenyltrichloroethane accentuate the tendency of the product to become waxy in its solid form. In any event, the waxy character of dichlorodiphenyltrichloroethane, particularly in the material which is not of the highest purity, raises many problems in processing and handling. The grinding of this material, for example, is particularly difficult, and in the past it has been common to mix the material with solid carbon dioxide in order to chill the waxy solid to a temperature where it becomes brittle, and then grind this mixture of chilled dichlorodiphenyltrichloroethane and solid carbon dioxide. Such grinding operations obviously require special equipment and are costly to carry out.

In co-pending U. S. application Ser. No. 606,478, filed July 21, 1945, now Patent No. 2,491,160, there has been described a process by which a DDT product which would normally be obtained as a waxy solid may be produced in a very desirable friable solid form by cooling the DDT product quickly; i. e., within five or ten minutes and preferably almost instantaneously, from a temperature above its setting point to a temperature below about 50° or 60° C., and subjecting the material to agitation at least during the initial stages of solidification. Patent No. 2,491,160 describes several procedures for carrying out this cooling and solidifying of DDT, including contact of the DDT with a solid surface, with relative movement by scraping or other means, spraying the DDT into an inert gas or liquid medium, during which solidification is initiated, and especially pouring the molten DDT into a body of water of sufficient quantity and of adequately low temperature to cool the DDT very quickly to the temperature indicated, the body of water and DDT being vigorously agitated during the cooling, for example by means of a rotating paddle agitator. The DDT is thus transformed into the desired friable product, usually obtained in the form of large lumps.

I have now discovered a particularly advantageous procedure for carrying out the cooling and solidification of Patent No. 2,491,160 by which the desirable hard, brittle, friable form of DDT may be obtained, employing an aqueous or other liquid heat transfer medium, at a minimum power and handling cost, and with the occlusion of a minimum of water or other heat transfer liquid within the mass of product obtained. My process involves the steps of (a) extruding the molten DDT through a discharge opening designed to break up the DDT into a large number of separate particles or filaments, into a body of heat transfer liquid, the discharge opening preferably being located beneath the surface of the body of liquid, the liquid preferably being maintained either in a substantially quiet state or flowing slowly without turbulence past the discharged DDT and the liquid temperature being maintained below about 50° C., preferably below about 30° C., and most advantageously below about 27° C., particularly when the liquid is flowing, (b) permitting the extruded DDT to fall through the liquid without additional agitation to form a body of DDT which is in a coalesced fluid condition, and (c) permitting the body of coalesced fluid DDT to harden without additional agitation.

In the accompanying drawing, the single figure is a diagrammatic representation of an elevation of one form of apparatus for the batchwise production of DDT in a hard, friable solid form according to my new process.

I have found it important in order to obtain the advantages above pointed out that the discharge and the breaking up of the molten DDT be carried out in such a way that only minute particles of DDT are discharged into the body of liquid, and it is also important in order to obtain my advantages that the liquid be maintained at the above indicated temperatures and preferably in the quiescent or non-turbulent flow state above described. The discharge and breaking up of the molten DDT may be accomplished, for example, by forcing the molten DDT through relatively small orifices in a conduit positioned beneath (or just above) the surface of the body of liquid. By forcing the molten DDT under pressure, for example, through an orifice of less than one-eighth inch diameter (for example, in a disc-type spray nozzle having an orifice of about one-sixteenth inch diameter) I have found the DDT breaks up to form a spray, a cross-section of the spray apparently consisting of hundreds or even thousands of separate particles or filaments of the DDT, each of extremely small dimension. Some turbulence of the heat transfer liquid generally occurs when the molten DDT is sprayed above the surface of the liquid, and in preferred operation, therefore, the spray discharge is carried out beneath the liquid surface.

I have also found it important in order to obtain the advantages of my invention that the filaments or particles of extruded DDT be permitted to settle through the liquid with little or no additional agitation than the moving contact of the particles with the liquid. The moving contact of particles relative to cooling liquid may be regarded as agitation; it is not a degree of agitation, however, that involves violent turbulence within the cooling and crystallizing DDT. It is a feature of my invention that a highly turbulent degree of agitation is avoided after the DDT has been discharged into the cooling liquid. As this spray settles through the liquid, the desired quick cooling takes place, and although I do not wish to be limited to any theoretical explanation, I believe initial formation of crystal nuclei probably takes place during the moving contact of DDT with heat transfer medium. Since the settling ordinarily takes no more than a few seconds, I have found that the DDT material is still fluid when it reaches the bottom of the vessel containing the heat transfer liquid and can thus coalesce into a continuous body of fluid DDT material. The body of coalesced fluid DDT which thus forms is believed to contain a large number of crystal nuclei distributed therethrough, despite its being in a fluid condition. In any event, the DDT product eventually recovered upon the hardening of this fluid body (as more fully described below) is the desired hard, brittle solid showing surprisingly little occlusion of the heat transfer liquid, and is in a form easy to handle. It is a further important feature of my invention that the coalesced body of fluid DDT be permitted to set and harden without additional agitation of such violence as to cause marked turbulence within said body.

The process of the invention is applicable to any dichlorodiphenyltrichloroethane product which, when cooled from a molten state by the usual method of relatively slow cooling in a pan without agitation, forms a solid at ordinary temperatures that does not have sufficient friability to be ground from lump form to 20 to 100 mesh particle size in a hammermill at ordinarily prevailing temperatures. This waxy form of DDT may also be recognized by applying standard ASTM method No. D-785-44T to compressed tablets, as more fully described below. Such a material is referred to herein as "normally non-friable" DDT. As used herein, the expressions "DDT," "dichlorodiphenyltrichloroethane," "dichlorodiphenyltrichloroethane product" and "dichlorodiphenyltrichloroethane material" all denote products in which 2,2-bis(p-chlorophenyl)-1,1,1-trichloroethane is the predominant and important constituent, but which may contain minor amounts of other substances. In the claims, the expressions "DDT material" and "DDT product" are used in the same sense. As above pointed out, the somewhat impure technical grade dichlorodiphenyltrichloroethane obtained as the immediate product of synthesis, and containing about 70 to 85% by weight 2,2-bis (p-chlorophenyl)-1,1,1,trichloroethane is particularly waxy and non-friable when solidified by usual means, and the process of my invention is particularly advantageous for producing such material in a desired friable form. The process of my invention, however, is also applicable to other dichlorodiphenyltrichloroethane products; e. g., less pure and also partially purified dichlorodiphenyltrichloroethane ranging from as low as 50% up to 90% by weight 2,2 - bis(p - chlorophenyl) - 1,1,1 - trichloroethane content, whenever such products come within the class of normally non-friable materials as hereinabove defined. In all such products, the constituents other than 2,2-bis(p-chlorophenyl)-1,1,1-trichloroethane consist entirely or predominantly of other reaction products of the DDT synthesis reaction.

In a preferred method of carrying out the process of my invention, a normally non-friable DDT in molten form is prepared and maintained in suitable molten state, for example by holding it in a tank where the temperature can be held at 100 to 130° C. Molten DDT from this supply may then be fed to a spray head consisting of a horizontal pipe positioned, for example, at or near the surface of a body of water. From the sides and the lower face of this pipe, nozzles or nipples may project down close to or into the body of water. Molten DDT forced from these nozzles or nipples breaks up into the desired spray of minute filaments or particles which then fall through the body of water. A pressure is employed adequate to cause dispersion of the molten DDT into fine particles in the particular nozzle design used. For example, pressures of 30 to 100 or more pounds per square inch are generally employed, and considerably higher pressure may be used in suitably designed equipment.

The body of water may be entirely still or, in an advantageous method of carrying out the process of my invention, may be flowing slowly, preferably with little or no turbulence, in a generally horizontal direction, whereby a fresh supply of water of the desired temperature is constantly being supplied. The water temperature at the point where the streams of molten DDT are formed is always below about 50° C. and is preferably below about 30° C.; when the water is flowing, it is preferably maintained at a lower temperature, most advantageously below about 27° C. A lower limit for the water temperature is not critical; although a temperature of 0° C. or below could conceivably be used, as a practical matter temperatures below about 15° C. are rarely used.

When filaments of DDT are formed as above described, I have found that these usually become somewhat discontinuous, thus forming elongated particles which continue to drop down through the body of water, finally being deposited in a mass at the bottom of the tank of water. As the material begins to drop it quickly reaches a transient taffy-like state, and usually this state continues until the material has been deposited at the bottom of the vessel, thus permitting coalescence into a continuous body of DDT, which without further disturbance eventually sets to hard, solid form. During the breaking up of the DDT into fine particles or filaments and the dropping of these through the heat transfer medium the DDT quickly cools from above its setting point to below about 60° C., no more than a minute being required and usually one second or at most a few seconds being sufficient to accomplish the settling and cooling.

As above stated, the DDT collected at the bottom of the tank is eventually found to be in the form of a solid cake which can readily be shattered, and which is then the very desirable friable form of DDT rather than its normally waxy form. The mass of DDT thus deposited may be removed from the bottom of the tank batchwise by dumping, or by draining the water and breaking up and removing the friable DDT, or by having a continuous conveyor belt on the bottom of the tank and means for shattering the DDT cake after it hardens, thus removing the product continuously in a manner well known to one skilled in the art. In any case, the friable DDT is eventually obtained in lump form and it has been found that these lumps contain much less occluded water than is the case when the friable DDT is water-cast with paddle agitation. For example, the product of my invention may contain as little as 0.5% occluded water.

Having now described the process in general terms and given some of the preferred conditions of operation, a more detailed description will be given with reference to the accompanying drawing.

Technical DDT, of the normally non-friable type, is held in a suitable storage tank 1 in a molten state at a temperature of 100 to 130° C. Molten DDT from this supply is fed by pipes 2 to a pump 3 where pressures of 30 to 100 or more lbs./sq. in. are generated. The molten DDT under pressure is then conducted to a manifold 4 which lies under the surface of the water. Water or other heat transfer liquid is introduced through pipe 6 into tank 7 until the surface of the water 8 is at a level with a discharge nozzle 9 from which the water overflows. The water may be added entirely at one time or the water may be continuously introduced to the tank 7 as may be required to maintain the desired temperatures of the coolant liquid, water, as hereinbefore discussed. The manifold 4 has spray nozzles or nipples 5 projecting downward therefrom.

The molten DDT is forced through the nozzles or nipples 5 which break up the DDT into the desired spray 10 which falls as minute fluid filaments or particles 11 through the body of the water. The DDT filaments or particles 11 as they drop through the water to the bottom of the tank 7 are quickly cooled to a temperature from above its set point to below about 60° C. The DDT filaments 11 upon reaching the bottom of the tank 7 coalesce into a layer of DDT which eventually hardens into a non-waxy friable cake. The mass of DDT thus deposited may be removed from the bottom of the tank 7 by dumping or draining the water and breaking up and removing the friable DDT.

As above stated, the friable dichlorodiphenyltrichloroethane product is generally recovered as a solid of lump form. I have found that this solid material is surprisingly of such a friable character that it may readily be ground at ordinary temperatures by the usual types of grinder; e. g., a hammermill, etc., to a powder more than 85% of which is finer than 100 mesh, or may be air jet milled to a powder averaging 2½ microns particle size; these powder forms of product may be stored and handled without undue caking. Either before or after grinding, the solid is dried, preferably by heating, with circulation of air, at a temperature below about 60° C., preferably below 55° C.; this temperature limitation is important, since the friable solid, when heated, is transformed to the known waxy form of product at a temperature in the neighborhood of 60° C. The friable DDT is a crystalline material distinguished in its properties from the previously known soft, waxy form of DDT by its hard, brittle character; that is, by the behavior of each material when compressed tablets thereof are tested for hardness by the standard ASTM method No. D-785-44T employing the standard Rockwell hardness tester of that method. To carry out such test 50 gram samples of ground DDT are compressed into cylindrical discs at a pressure of 5,000 pounds per square inch forming discs of circular end faces 4 square inches in area and of approximate thickness 0.55 inch. Such tablets formed from the previously known waxy form of DDT are too soft to give a reading on the tester by the standard ASTM method above referred to. From tablets thus formed from the friable form of DDT, on the other hand, a reading can always be obtained on the Rockwell hardness tester by this standard ASTM method, and in the case of the preferred friable DDT product made when the temperature is below about 30° C., as herein disclosed, a positive "R" scale reading of hardness is obtained in this test.

The friable material, and especially the finely ground powder form in which it is readily produced, is most advantageous for agricultural uses; e. g., in the compounding of insecticidal dust mixtures. It is especially significant from the standpoint of agricultural economy that the well-known technical grade dichlorodiphenyltrichloroethane which has heretofore been produced only as a solid of pronounced waxy character can, by the process of my invention, be produced in this desirable friable form which is easily converted to a powder of substantially lower caking tendency.

The following examples are illustrative of the process of my invention.

Example 1

15 gallons of tap water (about 70° F.) was run into a steel drum 20½ in. inside diameter. Molten DDT was held at about 130° C. in a kettle. This was technical DDT, made by the usual sulfuric acid condensation of chloral and chlorobenzene, containing about 75% of the p—p' isomer, setting point 90° C. If solidified by cooling slowly in an open pan, this DDT would form a waxy solid.

About 25 lbs. of this molten DDT was extruded through a small orifice into the drum of water, beneath the surface, forming silk-like filaments of molten DDT believed to be of the order of 0.01 inch or less in diameter. It was observed that the product immediately after extrusion through the nozzle under water, settled to the bottom of the tank. Its consistency was that of half-cooked taffy, both slippery and sticky. The temperature of the water did not rise above 83° F.

Within a half hour the product had hardened into a solid brittle cake, porous and with some, but very little, occluded water. The physical characteristics of this cake were similar to hard taffy in that it broke sharply and appeared amorphous (although exhibiting a crystalline X-ray pattern).

The top surface of the hardened cake was covered with tiny craters—apparently some occluded wated in the product had been squeezed out as it settled to the bottom and coalesced.

*Example 2*

A distributor pipe (about 1 inch diameter, about 12 feet long) was fabricated to pass across the middle (lengthwise) of a casting tray. This distributor contained eleven 45° nozzles coming out of opposite sides of the pipe alternately, the end of each nozzle being turned downwardly. Each nozzle orifice was 3/64 inch in diameter. Material used in the entire system was steel or iron, excepting the nozzles which were brass.

The casting tray was filled with water almost to the distributor pipe level, the nozzle outlets being below the water surface.

Molten DDT, as described in Example 1, was pumped directly through nozzles into casting pan filled with water, where it broke up into a spray of filaments or particles believed to be of the order of 0.01 inch or less in diameter. Tray filled to about 2½" DDT on bottom in 40 minutes.

Running water, at a temperature ranging from 60° to 80° F., flowed slowly through the tray throughout the run and for 1 hour thereafter. The DDT in the mass at the bottom of the tray ranged in temperature from about 66° to 77° F. After one hour, material (DDT) was hard.

The water was siphoned off, and the DDT chipped out. 1400 lb. DDT were in the batch.

Both the product first produced by the solidification in water and the finely ground powder product eventually separated, when dried, had the characteristics and "feel" of a friable, brittle, hard solid and appeared to be substantially non-waxy in character. A sample of the same molten material slowly cooled in a pan and thereafter broken into lumps or otherwise subdivided, had the appearance of a wax and was entirely non-friable in character.

*Example 3*

Technical DDT was introduced into a glass-lined steam-jacketed dryer, and was stripped of monochloro-benzol by heating and steam distillation at a temperature of 215°–240° F. After all the monochloro-benzol had been driven off, the DDT was allowed to separate from remaining water, and the temperature was maintained around 215° F. A one-inch gear pump was then used to force molten DDT through spray nozzles into a large water bath.

The pumping system was equipped with a by-pass from the pump discharge back to suction side in order to regulate the flow to obtain optimum cooling conditions and yet avoid plugging the nozzles with DDT. The pump pressure was maintained between 75 and 100 p. s. i.

Eleven disc-type brass spray nozzles, with an orifice size of 0.055 inch, were equally spaced on a 10 foot one-inch diameter brass header. In the injection of the DDT, the nozzles on this header were placed one inch below the water surface.

The casting pans were of zinc coated iron construction of the following dimensions. Length 12 feet, width 5 feet, and depth one foot. Two pans were used for each 3000 lb. batch, and were used consecutively, a total of six pans being used to allow time for drainage of water between batches. About eleven inches of water at 65° F. was placed in each pan prior to the starting of the casting process. Crane facilities were provided for handling pans. Sufficient water was added through a ¾ inch pipe header drilled with 24 one-eighth inch holes to maintain constant temperature.

Depth of DDT in pan after casting was approximately four inches.

DDT ejected from the nozzles broke up into particles by the time it had traveled a few inches through the water. The DDT settled to the bottom of the pans with a consistency of heavy molasses. The temperature of this mass was within a very few degrees of the water temperature. Approximately one and one-half hours were required for the DDT to set up. The water was then drained off, and the DDT broken up into four inch cubes. These chunks were then air dried before grinding in the hammermill.

*Example 4*

Molten DDT was discharged into water in equipment as described in Example 2 except that the spray nozzles' outlets were elevated approximately ½ inch above the water. Pressure on the feed line was maintained at 100 p. s. i. Temperature range of the water was 66° F. to 75° F. The molten DDT together with possibly some entrained air caused some turbulence as it entered the water; as previously described the DDT broke up into thousands of filaments which settled through the water except for a small portion of the DDT which rose to the surface. As this DDT gathered at the surface, it dropped to the bottom of the pans because of its own weight. After about 45 minutes, the body of DDT in the bottom of the pans had hardened and was removed from the pans approximately 2 hours after the spraying into water was finished. The product was porous and hard.

The product of each of the above examples, when tabletted and tested on the Rockwell hardness tester as above described, gave a positive "R" scale reading.

In the process of my invention above decribed, instead of water one may employ aqueous solutions of salts, surface active agents, or other materials having no deleterious effect on the DDT, or one may employ non-aqueous inert heat transfer liquids such as alcohols or other volatile organic liquids, previously saturated with DDT, such volatile liquids having the possible advantage of being more readily removed from the DDT product.

In the claims the term "filament" is used to include both the long, thread-like filaments sometimes obtained in the spraying of molten DDT and also the relatively shorter particles which nevertheless have a small cross-sectional dimension as compared to their length. The term "turbulent agitation" is used in the claims to denote disturbance of greater violence than is involved in the settling of DDT particles or filaments through cooling liquid and greater than the relatively minor disturbance involved in the coalesence of these particles or filaments into a continuous fluid body and expulsion of occluded water from this body by settling.

Since many modifications are possible in the process of my invention as above described without departing from the scope of the invention, it is intended that the above description of my invention should be interpreted as illustrative, and the invention is not to be limited thereby.

I claim:

1. The method of producing a normally waxy DDT material in a hard, solid form, that involves discharging the DDT material in molten form into a heat transfer liquid in the form of fluid filaments of said material, the heat transfer liquid being maintained at a temperature below about 50° C., with moving contact of the DDT material relative to the heat transfer liquid to cool the DDT material quickly from above its setting point to below 60° C., the said heat transfer liquid having no deleterious effect on the DDT at the said temperatures, and thereafter, without turbulent agitation, collecting and coalescing the fluid filaments of cooled DDT.

2. The method of producing a normally waxy DDT material in a hard, solid form, that involves discharging the DDT material in molten form into a heat transfer liquid in the form of fluid filaments of said material, the heat transfer liquid being maintained at a temperature below about 30° C., with moving contact of the DDT material relative to the heat transfer liquid to cool the DDT material within a few seconds from above its setting point to below 60° C., the said heat transfer liquid having no deleterious effect on the DDT at the said temperature, and thereafter, without turbulent agitation, collecting and coalescing the fluid filaments of cooled DDT.

3. The method of producing technical normally waxy DDT in hard, friable, solid form, that involves extruding molten technical DDT beneath the surface of an aqueous heat transfer liquid in the form of fluid filaments, the heat transfer liquid being maintained in a substantially quiescent state and at a temperature below about 30° C., with moving contact of the DDT relative to the heat transfer liquid to cool the DDT from above its setting point to below 60° C. within a period of a few seconds, the said aqueous heat transfer liquid having no deleterious effect on DDT at the said temperatures, and thereafter collecting and coalescing the cooled DDT and permitting it to harden without turbulent agitation.

4. In a method of producing a normally waxy DDT material in hard, brittle, friable, solid form, the step that comprises forcing the material in molten form through an orifice located beneath the surface of a body of heat transfer liquid which is maintained in a non-turbulent state and at a temperature below about 50° C., said orifice being sufficiently small that the molten material is broken up into a spray of fluid particles, with moving contact of the DDT material relative to the heat transfer liquid to cool the DDT material quickly from above its setting point to below about 60° C., the said heat transfer liquid having no deleterious effect on the DDT at the said temperature, and thereafter, without turbulent agitation, collecting and coalescing the fluid filaments of cooled DDT.

5. The method of producing a normally waxy DDT material containing from about 50% to about 90% by weight 2,2-bis-(p-chlorophenyl)-1,1,1-trichloroethane in hard, solid form that involves spraying the DDT material in molten form beneath the surface of an aqueous heat transfer liquid, the heat transfer liquid being maintained in a non-turbulent state and at a temperature below about 30° C., and permitting the spray of fluid DDT material to settle through said transfer liquid to cool the DDT material from above its setting point to below 60° C., within a period of a few seconds, the said aqueous heat transfer liquid having no deleterious effect on DDT at the said temperatures, and thereafter, without turbulent agitation, collecting and coalescing the fluid particles of cooled DDT and permitting the resulting mass to harden.

6. The method of producing a normally waxy DDT material containing from about 70% to about 85% by weight 2,2,-bis-(p-chlorophenyl)-1,1,1-trichloroethane in hard, brittle, friable, solid form that involves spraying the DDT material in molten form beneath the surface of an aqueous heat transfer liquid as fluid filaments having an average cross-sectional dimension of the order of magnitude of less than a hundredth of an inch, the heat transfer liquid being maintained in a non-turbulent state and at a temperature below about 30° C., permitting the spray of DDT material to settle through said transfer liquid to cool the DDT material from above its setting point to below 60° C. within a period of a few seconds, the said aqueous heat transfer liquid having no deleterious effect on DDT at the said temperatures, and thereafter collecting and coalescing the cooled material and permitting it to harden without turbulent agitation.

CYRIL HAYWARD.

References Cited in the file of this patent

UNITED STATES PATENTS

| Number | Name | Date |
|---|---|---|
| 2,484,792 | Mollring | Oct. 11, 1949 |
| 2,491,160 | Bruce et al. | Dec. 13, 1949 |